(12) United States Patent
Vom Stein

(10) Patent No.: US 9,493,198 B2
(45) Date of Patent: Nov. 15, 2016

(54) SEALING ASSEMBLY AND HINGE OF A TRACK HAVING THE SEALING ASSEMBLY

(75) Inventor: Hans-Joachim Vom Stein, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 458 days.

(21) Appl. No.: 13/642,059

(22) PCT Filed: Apr. 21, 2011

(86) PCT No.: PCT/EP2011/056392
§ 371 (c)(1),
(2), (4) Date: Dec. 7, 2012

(87) PCT Pub. No.: WO2011/134878
PCT Pub. Date: Nov. 3, 2011

(65) Prior Publication Data
US 2013/0200688 A1    Aug. 8, 2013

(30) Foreign Application Priority Data

Apr. 28, 2010 (DE) ........................ 10 2010 018 552

(51) Int. Cl.
*B62D 55/088* (2006.01)
*F16J 15/34* (2006.01)
(52) U.S. Cl.
CPC .......... *B62D 55/0887* (2013.01); *F16J 15/344* (2013.01)

(58) Field of Classification Search
CPC ................ B62D 55/088; B62D 55/0887; F16J 15/344; F16J 15/3456; F16J 15/32
See application file for complete search history.

(56) References Cited

U.S. PATENT DOCUMENTS

| | | | |
|---|---|---|---|
| 4,295,654 A | 10/1981 | Kawamura et al. | |
| 4,396,198 A | 8/1983 | Metzner et al. | |
| 4,607,854 A | 8/1986 | Bissi et al. | |
| 4,819,999 A * | 4/1989 | Livesay et al. | 305/103 |
| 5,390,997 A | 2/1995 | Nakaishi et al. | |
| 5,794,940 A * | 8/1998 | Brueggmann | 277/364 |
| 5,826,884 A * | 10/1998 | Anderton et al. | 277/396 |
| 5,899,459 A * | 5/1999 | Watts | 277/380 |
| 6,105,969 A * | 8/2000 | Anderton et al. | 277/405 |
| 7,845,740 B2 * | 12/2010 | Dahlheimer | 305/102 |
| 8,113,597 B2 * | 2/2012 | Grenzi | 305/104 |
| 2010/0148572 A1 | 6/2010 | Vom Stein | |

(Continued)

FOREIGN PATENT DOCUMENTS

| | | |
|---|---|---|
| DE | 2726033 A1 | 12/1977 |
| DE | 3146175 A1 | 6/1983 |

(Continued)

*Primary Examiner* — Kip T Kotter
(74) *Attorney, Agent, or Firm* — Bryan Peckjian; SKF USA Inc. Patent Dept.

(57) ABSTRACT

A sealing assembly is disposed so as to provide a sealing function between two parts of a track that are movable relative to each other. The sealing assembly includes an elastic ring having a radially-encircling sealing lip that fixedly and sealingly abuts on a first part of the track. The sealing assembly also includes a support ring that is rotatable relative to a sealing ring having a sealing edge. The support ring has a slip surface, on which the sealing edge sealingly abuts.

9 Claims, 2 Drawing Sheets

(56) References Cited

U.S. PATENT DOCUMENTS

2011/0248561 A1    10/2011  Dolata

FOREIGN PATENT DOCUMENTS

| | | |
|---|---|---|
| DE | 19732849 A1 | 2/1998 |
| DE | 102004031941 A1 | 1/2006 |
| DE | 102006050439 A1 | 5/2008 |
| DE | 102008049911 A1 | 4/2010 |
| GB | 1576029 A | 10/1980 |
| WO | WO8900523 A1 | 1/1989 |
| WO | WO 2008049529 A1 * | 5/2008 |
| WO | WO2008093160 A1 | 8/2008 |

* cited by examiner

SEALING ASSEMBLY AND HINGE OF A TRACK HAVING THE SEALING ASSEMBLY

CROSS-REFERENCE

This application is the U.S. National Stage of International Application No. PCT/EP2011/056392 filed on Apr. 21, 2011, which claims priority to German patent application no. 10 2010 018 552.3 filed on Apr. 28, 2010.

TECHNICAL FIELD

The invention relates to a sealing assembly for sealing between two parts of a track, which parts are moveable relative to each other, and a hinge of a track having the sealing assembly.

RELATED ART

In tracks, in particular of tracked vehicles, the links of the track are typically connected with each other via pivot pin hinges. For this purpose, such a pivot pin hinge comprises a pin and a sleeve that is rotatably suspended over the pin, wherein links of the track are press-fit onto the respective ends of the pin and the sleeve. The pivot bearing surfaces between the pin and the sleeve are lubricated by an oil reservoir in the pin, wherein the oil chamber between the pin and the sleeve is sealed by two sealing elements that comprise sealing lips pressing against the end faces of the sleeve.

A track pin assembly having a seal is known, for example, from DE 27 26 033 AI, wherein the track pin assembly comprises a track pin with a portion of a first track link attached to the track pin and a bushing having a portion of a second track link attached to the bushing; the bushing surrounds a portion of the track pin and is reciprocally movable relative to the track pin. Further, the track pin assembly comprises a cavity disposed in the first track link for receiving the seal, which is provided with a sealing lip for abutment on an end face of the bushing, and a spacer ring, which surrounds the track pin and extends in the axial direction between an end face of the cavity and the end face of the bushing; the outer circumferential surface of the spacer ring, together with the end face of the bushing and the cavity, forms a hollow space for receiving the seal. The seal inserted in the hollow space comprises a primary seal ring made of a relatively stiff, but elastic, first elastomeric material and a secondary sealing element made of a second resilient elastomeric material that is substantially less stiff than the first material.

A sealing assembly for a track pivot pin hinge is known from U.S. Pat. No. 4,607,854, in which a first ring made of a flexible elastomeric material having a sleeve-like portion and a first for sealing a space between a pin and a sleeve surrounding the pin are provided. The first ring comprises a cylindrical, metallic reinforcing ring that is completely embedded in the sleeve-like portion of the first ring.

A sealing assembly and a track link of the above mentioned type are known from DE 10 2006 050 439 AI. The sealing assembly comprises a sealing ring with a sealing edge, which abuts on an element of the track in a sealing manner. A metallic support ring is embedded in the sealing ring for reinforcing the sealing assembly. An elastic ring is pushed onto the support ring, which elastic ring has a sealing lip that abuts on a further element of the track.

SUMMARY

It is the object of the present teachings to disclose a sealing assembly for sealing between a first part of a track and a second part of the track that is at least pivotable relative to the first, which sealing assembly preferably has a particularly long service life, as well as to disclose a corresponding hinge of a track.

The present disclosure is directed to a sealing assembly for sealing between two parts of a track, which parts are moveable relative to each other, and which sealing assembly includes an elastic ring, which includes a radially-encircling sealing lip for fixedly and sealingly abutting on a first part of the track, and having a support ring and a sealing ring having a sealing edge. The support ring is rotatable relative to the sealing ring and includes a slip surface, on which the sealing edge abuts in a sealing manner.

In known embodiments of sealing assemblies for track hinges, the sealing edge abuts on a sleeve of the track hinge. The sealing edge is thus oriented axially- or radially-outward relative to the sealing assembly. The sleeve of the track hinge includes a slip surface appropriate for the sealing edge. So that the slip surface achieves a service life that is as long as possible while simultaneously achieving a high sealing effect in interaction with the sealing edge, as a general rule the slip surface of the sleeve must be lapped and supplementally hardened. This requires a relatively high manufacturing expenditure already when manufacturing the components of the track hinge.

In contrast thereto, the slip surface for the sealing ring in the sealing assembly according to the invention is embodied on the support ring itself. Consequently, the dynamic sealing function of the sealing assembly is achieved by the sealing edge of the seal ring, which sealing edge slides over the slip surface, and thus without inclusion of components not belonging to the sealing assembly itself. With the sealing assembly according to the invention, it is possible to implement the moving parts of the track much more easily in comparison with known exemplary embodiments. In particular, it is no longer necessary to provide a slip surface for the sealing edge on a component not belonging to the seal, which slip surface must in additional be made low-wear using complex methods.

In a preferred embodiment the support ring is made from a metallic material. The support ring can in particular be made from a hard metal or an appropriate alloy of such a type that the slip surface requires no additional hardening. In this respect a low-wear slip surface can be manufactured using relatively simple means, wherein a long service life is simultaneously ensured with a simultaneously good sealing effect of the sealing edge.

In a further preferred embodiment the slip surface is hardened and/or lapped. In this embodiment the support ring is made from a material, which has an increased wear in comparison with hard metallic materials. The wear is reduced specifically in this area by lapping and/or hardening of the slip surface, and thus a long service life of the sealing assembly is ensured. It is advantageous here, however, that the quality of the slip surface is closely matchable to the respective sealing edge. As a general rule, the sealing assembly is manufactured namely as a complete structural unit and is then joined together with the moving elements of the track when assembling of the entire track. In known embodiments of sealing assemblies, the actual dynamic sealing function due to the sealing edge and slip surface on an element of the track was thus achieved through two different manufacturing processes and only after the assembly process of the track. In the sealing assembly according to the invention, this can be ensured in a completed manner in one structural unit, namely the sealing assembly itself.

In a preferred embodiment of the invention, the sealing ring has at least one groove, through which oil is guidable to the sealing edge. To ensure a good sealing function, the sealing edge must be lubricated. This also reduces the abrasion on the slip surface of the support ring. In this respect an ensurance of the oil supply is advantageous for the service life of the sealing assembly. A connection to the oil chamber, which will be sealed towards the outside, can be produced using a groove in the sealing ring, so that the sealing edge and the slip surface can accordingly be lubricated with oil.

In an advantageous design of the invention, the support ring is fixedly connected with the elastic ring, wherein the support ring is disposed between the elastic ring and the sealing ring. In this embodiment, the sealing edge of the sealing ring is consequently embodied axially or radially in the direction of the elastic ring, so that it can effect its sealing function on the slip surface of the support ring lying between them.

In an advantageous design of the invention, the sealing ring includes a sealing surface for fixedly and sealingly abutting on the second part of the track. The sealing ring can thus be connected with the second part of the track so that there is no relative rotation. Consequently the dynamic sealing function on the sealing edge of the sealing ring, which sealing edge slides on the slip surface of the support ring, is reduced.

In an alternative embodiment of the invention, the sealing ring is fixedly connected with the elastic ring, and is disposed between the elastic ring and the support ring. In this exemplary embodiment, the support ring preferably has a sealing surface for fixedly and sealingly abutting on the second part of the track. In both embodiments the sealing surface is preferably coated with a material that is softer than the material of the sealing ring or of the support ring. A good retaining function on the second part of the track can be ensured thereby.

Further advantages and designs of the invention arise from the exemplary embodiment described below with reference to the accompanying Figures.

DETAILED DESCRIPTION OF THE INVENTION

Figure 1:
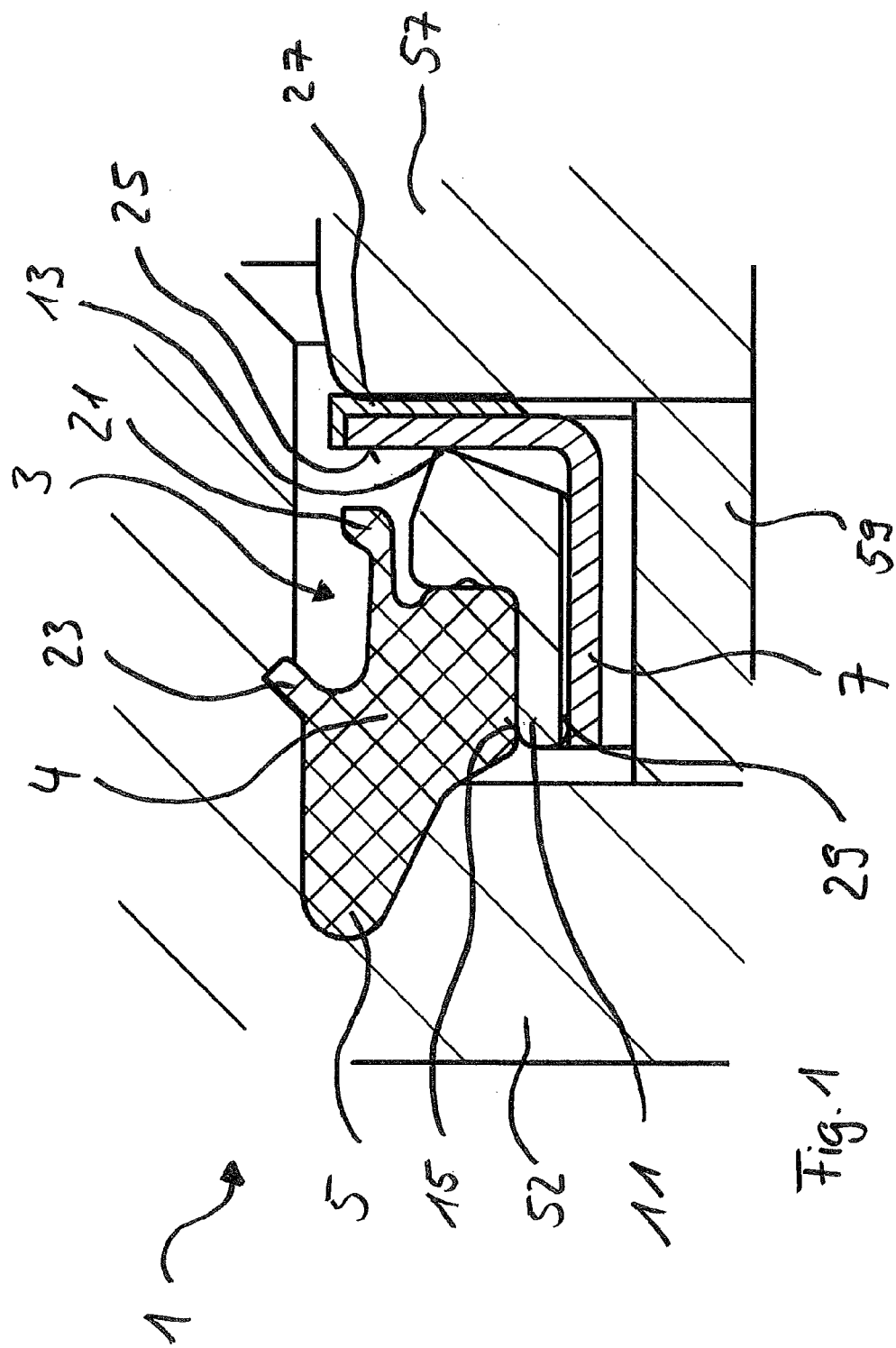
FIG. 1 shows a sealing assembly according to a first embodiment of the present teachings.

In FIG. 1 a first exemplary embodiment of the invention is depicted. A hinge 1 of a track comprises, here only partially shown, parts which are pivotable relative to each other; a seal 3 is inserted between them. The first part of the track comprises an outer track link 52, which is pushed onto a pin. The second part of the track comprises a sleeve 57, which is suspended over the pin with a radial clearance and which is pivotable relative to the pin; an inner track link not-illustrated here is press-fittable onto the sleeve 57. Further, a spacer ring 59 is disposed between the outer track link and the sleeve 57 with an axial clearance.

The seal 3 comprises an elastic ring 4, which is made for example from an elastomer. The elastic ring 4 includes a sealing lip 5, which is formed for abutting on a sealing surface or an opposing surface of the outer track link 52. The elastic ring 4 is designed in a radially-encircling manner and is fixedly connected with a sealing ring 11 on its radially-inward oriented side. A contact surface 15 is formed between the elastic ring 4 and the sealing ring 11. Further, the seal 3 comprises a support ring 7, which has a substantially L-shaped base shape. The support ring 7 abuts radially on the sealing ring 11 and is designed so as to be rotatable relative thereto. A slip surface 25 for a dynamic sealing edge 13 of the sealing ring 11 is formed on a section of the support ring 7 which is axially adjacent to the sealing ring 11.

On the axially opposite side, the section of the support ring 7 has a sealing surface 27. The support ring 7 is axially connected with the sleeve 57 by the sealing surface 27, so that rotation of the support ring 7 relative to the sleeve 57 is prevented. The sealing surface 27 consequently acts as a static seal. The support ring 7 is for example made from a metal. On the other hand, the sealing surface 27 is coated with a softer material, for example rubber, so that the support ring 7 moves relative to the seal ring 11 when the sleeve 57 moves. Consequently the dynamic function of the seal 3 on the movement of the sealing edge 13 on the slip surface 25 is reduced.

In order to transport the lubricant, for example oil, on the slip surface 25 and to the sealing edge 13, which lubricant is required for the ensurance of the sealing function, the sealing ring has an axially extending groove 29. Through this, oil is bringable from the to-be-sealed oil chamber of the track hinge 1 into the chamber of the sealing edge 13. In addition, by forming multiple grooves 29 around the circumference of the seal 3, it can be ensured that the sealing ring 11 slides well on the support ring 7.

The elastic ring 4 also has an axial projection 21, which extends in the same direction as the sealing edge 13 and is disposed outside of the sealing edge with reference to the radial direction. When the seal 3 is installed as intended, the projection 21 also abuts on the slip surface 25. It thus serves as an additional seal and, in particular, as protection for the sealing edge 13. Further, the outer side of the elastic ring 3 includes an annular-extending bulge 23 projecting outwardly and obliquely to the right side. This serves in particular for to retain the seal 3 during the installation in the track link 1.

In FIG. 1, the first and second parts of the track and the spacer ring 59 are illustrated in the assembled state, but the elastic ring 4, in particular, and also the sealing ring 11, are illustrated in the still-undeformed state that exists before the two parts of the track are pushed together. When the two parts of the track are assembled into the final operational state (not illustrated), then the elastic ring 4 will become highly deformed, whereby the sealing lip 5 sealingly abuts on the outer track link 52 and, at the same time, presses the sealing edge 13 via the sealing ring 11 against the slip surface 25 on the support ring 7. Further, the projection 21 of the elastic ring 4 is thereby pressed against the slip surface 25 of the support ring 7.

During operation, the two parts of the track are pivoted relative to each other about a defined angle, e.g., up to 30° when installed as intended. The pivoting movement takes place between the pin having the outer track link 52 pressed thereon and the sleeve 57 having the inner track link attached thereto. Due to the relative movement of the components, the sealing elements of the seal 3 are dynamically loaded in at least one segment. The sealing lip 5 of the elastic ring 4 statically abuts on the track link 52 so that the elastic ring 4 and the sealing ring 11 fixedly connected therewith do not move relative to the track link 52. In contrast, the sealing edge 13 of the sealing ring 11 is dynamically loaded and thus carries out a movement relative to the support ring 7. Thus, during the pivoting, the sealing edge 13 slides along the slip surface 25 of the support ring 7 in a sealing manner.

Figure 2:
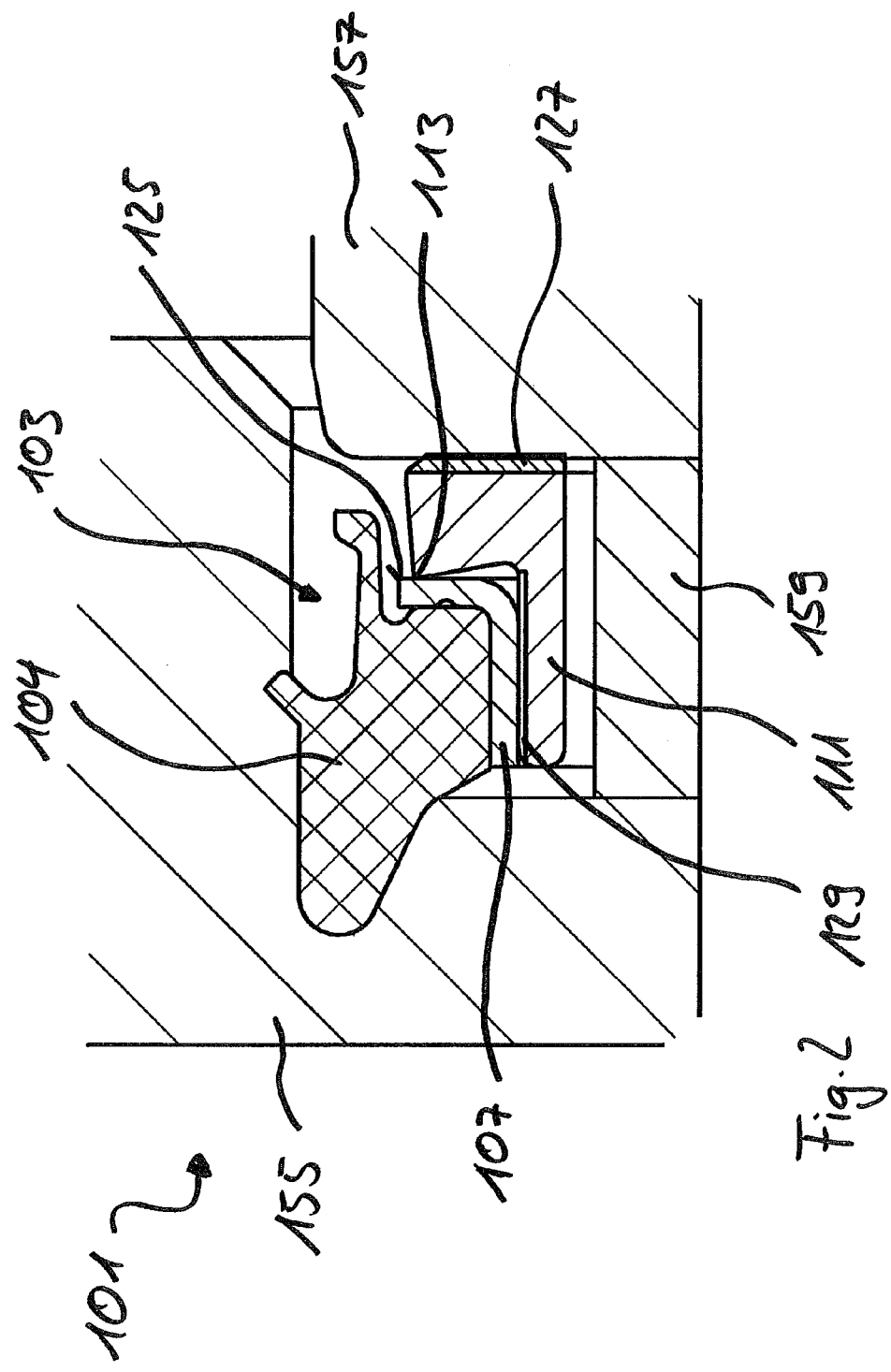
FIG. 2 shows a sealing assembly according to a second embodiment of the present teachings.

A further exemplary embodiment of the invention is depicted in FIG. 2. A track link 101 is constructed in an analogous manner to the exemplary embodiment of FIG. 1. Consequently it is comprised of an outer track link 155, which is pivotable with respect to a sleeve 157. A spacer ring 159 is disposed between the outer track link 155 and the sleeve 157.

A seal 103 is disposed between the outer track link 155 and the sleeve 157. The seal comprises an elastic ring 104 which is formed in an identical manner to the elastic ring 4 of the embodiment of FIG. 1. In contrast to the exemplary embodiment of FIG. 1, however, the elastic ring 104 is fixedly connected with a support ring 107. A sealing ring 111 is disposed so as to be pivotable relative to the support ring 107. The support ring 107 has a radially-extending shape, which is L-shaped in cross-section, and includes a slip surface 125 that lies axially-outward. The sealing ring 111 in turn includes a sealing edge 113, which slides dynamically on the slip surface 125. With respect to the sealing function, the sealing edge 113 and the slip surface 125 correspond to the exemplary embodiment of FIG. 1. In contrast thereto, the sealing ring 111 however includes a sealing surface 127, by which it is disposed on the sleeve 157 so that there is no relative rotation. Thus the dynamic sealing function here is also limited to the sealing edge 113. In an analogous manner to the exemplary embodiment of FIG. 1, the sealing ring 111 includes a groove 129 for supplying oil from the oil chamber to the sealing edge 113.

REFERENCE NUMBER LIST

1 Hinge
3 Seal
4 Elastic ring
5 Sealing lip
7 Support ring
11 Sealing ring
13 Sealing edge
15 Contact surface
21 Projection
23 Bulge
25 Slip surface
27 Sealing surface
29 Groove
52 Track link
57 Sleeve
59 Spacer ring
101 Hinge
103 Seal
104 Elastic ring
107 Support ring
111 Seal ring
113 Sealing edge
125 Slip surface
127 Sealing surface
129 Groove
155 Outer track link
157 Sleeve
159 Spacer ring

The invention claimed is:

1. A sealing assembly for sealing between first and second parts of a track that are movable relative to each other, the sealing assembly comprising:
   an elastic ring having a radially-encircling sealing lip configured to fixedly and sealingly abut on the first part of the track,
   a sealing ring having a sealing edge, and
   a support ring that radially abuts against and is rotatable relative to the sealing ring, the support ring having a slip surface, on which the sealing edge sealingly abuts,
   wherein the sealing ring has at least one groove configured to guide oil to the sealing edge.

2. The sealing assembly according to claim 1, wherein the support ring is fixedly connected with the elastic ring so that there is no relative rotation and is disposed between the elastic ring and the sealing ring.

3. The sealing assembly according to claim 2, wherein the sealing ring includes a sealing surface configured to fixedly and sealingly abut on the second part of the track.

4. The sealing assembly according to claim 1, wherein the sealing ring is fixedly connected with the elastic ring so that there is no relative rotation and is disposed between the elastic ring and the support ring.

5. The sealing assembly according to claim 4, wherein the support ring includes a sealing surface configured to fixedly and sealingly abut on the second part of the track.

6. The sealing assembly according to claim 5, wherein the sealing surface is coated with a softer material than the material of the support ring.

7. The sealing assembly according to claim 6, wherein the softer material is rubber.

8. The sealing assembly according to claim 4, wherein the sealing ring includes a sealing surface and wherein the sealing surface is coated with a softer material than the material of the sealing ring.

9. A hinge of a track comprising:
   a first part that is pivotable relative to a second part, and
   the sealing assembly according to claim 1 disposed between the first and second parts.

* * * * *